United States Patent
Gisy et al.

(10) Patent No.: US 7,319,925 B2
(45) Date of Patent: Jan. 15, 2008

(54) DEVICE FOR CONTROLLING ELECTRICAL SYSTEMS WITH A TEST MODULE

(75) Inventors: Ralf Gisy, Boeblingen (DE); Dieter Grohmann, Gechingen (DE)

(73) Assignee: DaimlerChrysler AG, Stuttgart (DE)

(*) Notice: Subject to any disclaimer, the term of this patent is extended or adjusted under 35 U.S.C. 154(b) by 601 days.

(21) Appl. No.: 10/478,723

(22) PCT Filed: Mar. 16, 2002

(86) PCT No.: PCT/EP02/02955

§ 371 (c)(1),
(2), (4) Date: Jun. 8, 2004

(87) PCT Pub. No.: WO02/096707

PCT Pub. Date: Dec. 5, 2002

(65) Prior Publication Data

US 2004/0232770 A1    Nov. 25, 2004

(30) Foreign Application Priority Data

May 26, 2001 (DE) ............................... 101 25 818

(51) Int. Cl.
*G05B 19/042* (2006.01)
*G06F 19/00* (2006.01)

(52) U.S. Cl. .......................... 701/29; 701/30; 701/33; 701/35

(58) Field of Classification Search ................ 701/29, 701/30, 33, 35.1
See application file for complete search history.

(56) References Cited

U.S. PATENT DOCUMENTS 5,577,198 A * 11/1996 Willrett et al. ................. 714/33
5,657,224 A * 8/1997 Lonn et al. ..................... 701/29
5,831,409 A * 11/1998 Lindberg et al. ............ 318/801
5,884,206 A * 3/1999 Kim ............................ 701/50
6,058,343 A * 5/2000 Orbach et al. ................. 701/50
6,560,528 B1 * 5/2003 Gitlin et al. ................. 701/115
6,904,348 B2 * 6/2005 Drummond et al. .......... 701/49

FOREIGN PATENT DOCUMENTS

| DE | 19618161 C1 | 6/1997 |
| DE | 19642843 A1 | 4/1998 |
| DE | 10014709 A1 | 9/2001 |
| EP | 0332727 A1 | 9/1989 |

* cited by examiner

Primary Examiner—Tan Q. Nguyen
(74) Attorney, Agent, or Firm—Crowell & Moring LLP

(57) ABSTRACT

A device for controlling electrical systems of a means of transportation that is encapsulated within a housing provided with an external interface and that has a microcomputer for executing control programs and storage means on which control programs for actuating an electrical component and signals of the component can be stored, the signals being exchanged via an internal interface by actuation software of the electrical component. According to the invention, a test module is provided within the housing and at the internal interface of the component, which test module evaluates the signals of the component which are exchanged via the interface, in order to test the satisfactory functioning of an internal component or of the control program.

16 Claims, 1 Drawing Sheet

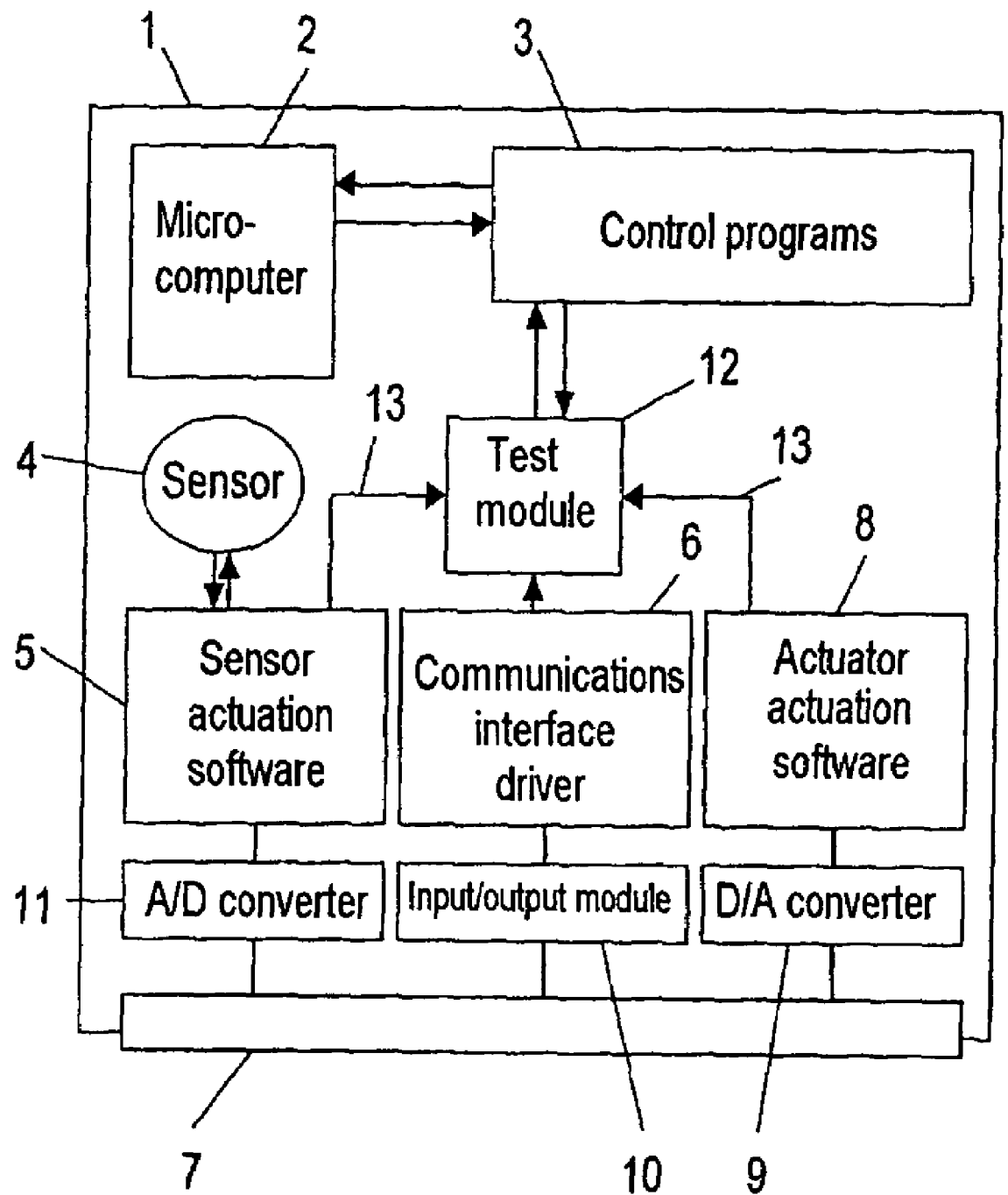

DEVICE FOR CONTROLLING ELECTRICAL SYSTEMS WITH A TEST MODULE

CROSS-REFERENCE TO RELATED APPLICATIONS

This application claims the priority of German application 101 25 818.6, filed May 26, 2001, which was filed as International Application No. PCT/EP02/02955, on Mar. 16, 2002, the disclosure of which is expressly incorporated by reference herein.

FIELD OF THE INVENTION

The invention relates to a device for controlling electrical systems for a means of transportation. The device is encapsulated within a housing that has an external interface. The device includes a microcomputer for executing control programs and storage means on which the control programs and signals, for example result data from a sensor, can be stored by control processes, which signals are exchanged via an internal interface by actuation software of a sensor or actuator.

BACKGROUND OF THE INVENTION

In means of transportation such as motor vehicles or aircraft, electrical and/or electonic components are often embodied as microcomputers encapsulated within a housing. Control programs are stored in an assigned storage means and are activated in order, for example, to carry out the measurement of the temperature of the engine and to control or regulate the temperature of the engine by means of actuators, for example, final positioning elements. In order to actuate the sensors or actuators, actuation software or driver software is provided, said software bringing about not only the actuation of the sensors/actuators but also their data flow. Here, data are transmitted to the sensor/actuator via an internal interface of the device, and result data are transmitted back from the sensor/actuator via the interface in order to be further processed by the microcomputer.

The increasing use of electrical components in means of transportation, in particular in motor vehicles, and the increasing complexity of electronics has led to a situation in which the functionality and quality of the electrical processes and components have to be tested in various stages of the development phases. For this purpose, what are referred to as hardware-in-the-loop (HIL) systems are used in which the technical environment of a component is simulated in terms of the electrical input and output signals. During testing, the completely developed component is connected to the HIL system, which simulates the real vehicle environment of the component with its electrical actuation signals. The electrical behavior of the component is tested in terms of possible malfunctions by means of various test signals. In this way, electrical systems and components can be tested during the development phase, alone or in a component grouping, before the prototype of the vehicle exists.

Testing electrical components today requires that the component to be tested be adapted on a simulation computer. As control devices in vehicles today are encapsulated within a housing, a test procedure is problematical in particular if sensors, for example, measuring pickups or switches, or actuators, for example, motors or lamps, are arranged within the housing. In order to adapt the component to the simulation environment, it is then necessary to open the housing and disconnect signal lines in the control device and possibly connect them differently for test purposes.

As a result, a high degree of expenditure in terms of time and personnel is necessary when adapting new hardware states in control devices. The tested control devices are to a certain extent destroyed or damaged by the disconnection of existing signal lines so that after the test they can no longer be used in the vehicle.

DE 196 42 843 A1 discloses a method for checking the control device. In order to check the control device, some of the input signals of the control device are replaced by test signals.

EP 0 332 727 A1 discloses a device for testing electrical control devices in which the operating software of the control device is replaced by test software and the inputs and outputs of the control device are short-circuited by means of a plug-type connector. An external test monitor then displays the test data of the control device.

SUMMARY OF THE INVENTION

The object of the present invention is, therefore, to further develop a device for testing components in means of transportation in such a way that encapsulated control devices can be tested in an automated fashion with an internal sensor even without opening the housing.

This object is achieved according to the invention by means of the features of the claims. In particular, there is a device for controlling electrical systems of a means of transportation, which is encapsulated within a housing provided with an external interface and which has a microcomputer for executing control programs and storage means on which control programs for actuating an electrical component and signals of the component can be stored, the signals being exchanged via an internal interface by actuation software of the electrical component, and a test module being provided within the housing and at the internal interface of the component in order to evaluate the signals of the component which are exchanged via the interface and in order to test the satisfactory functioning of the component or of the control program, characterized in that an internal sensor or internal actuator is arranged as an internal component within the encapsulated housing, in that the test module is arranged between the control programs and the internal component where the entire data flow to and from the components to be tested runs and in that the test module checks the incoming or outgoing signals of the internal component for faults. According to these features, an internal sensor or actuator is arranged as an internal component within the encapsulated housing, the test module is arranged between the control programs and the internal component where the entire data flow to and from the components to be tested runs, and the test module checks the incoming or outgoing signals of the internal component for faults.

According to the invention, the test module is arranged at the interface between the internal component to be tested, for example the sensor/actuator, and the control programs, which actuate the sensor/actuator and ensure its satisfactory use. The particular arrangement of the test module at the internal interface via which the entire data flow from and to the sensor/actuator runs enables the test module to carry out an automatic testing process with the result data of the component without the housing of the device having to be opened in the process. In a device which is implemented, for example, as an engine control device, the part of the interface which was previously necessary for connecting a signal interface for simulating test signals can be dispensed with as a result of the internal arrangement of the test module.

The test module can interrupt the data flow from and to the component and simulate the data itself, which is necessary for the function of the component. Likewise, the data flow for actuating the component can be interrupted at the interface starting from the control programs and the test module can supply the sensor/actuator with dedicated simulation data. In addition, the test module can also influence the data flow via the external interface, where, for example, a CAN data bus is connected.

The test module has functions that permit signals to be simulated, measured and triggered. The data exchanged via the internal interface can easily be parameterized, without hardware changes being necessary in the control device. The test module has access to all the data that are exchanged via the internal interface or the external interface, and can execute diverse test functions in order to test the functioning of the device, i.e., of the control programs of the control device and of the internal or external components, i.e., sensors or actuators.

The test module is preferably a software module that is arranged between the control programs and the driver software of the sensor that is arranged within the housing. As a result, changes in the test procedure can easily be implemented by programming. The test module can either generate the test signals and simulation signals itself or read them from the outside via the external interface, in order to then supply the sensor with these test signals. New test programs for the test module can also be subsequently loaded via the external interface. As a result, the test processes can be adapted over the service life of the control device.

As a result, the costly electrical adaptation of internal sensors/actuators of the device is dispensed with. The arrangement of the test module in the control device itself leads to a considerable saving in cost and time. The destruction of the test object as a result of the disconnection of signal lines is no longer necessary, so that even series-management control devices can be tested by the internal test system. In addition, simple and rapid manipulation of interface signals is possible as only the parameterization of the test signals is necessary.

The test module has functions that can simulate different electrical signals. For example, power sources, current sinks, ratiometric components, resistances and amplification levels can be simulated. The load simulation can either be carried out with original loads or equivalent loads. In order to test the behaviour of the electrical component, i.e., of the sensor or actuator, each pin of the external interface of the device can be connected to an external fault simulation module, which generates additional fault signals for the test phase. In the process, various external test modules such as high current, low current or network test modules can be provided. In order to be able to test an electrical component with the test module in an automated fashion, automatic signal adaptation may be required.

The device can have both an internal sensor and an internal actuator as a component whose values can be manipulated by means of simulation signals via the external interface in order to test the control program. The internal components are arranged within the encapsulated housing so no further screened housings are consequently necessary, and the electrical lines to the separate housings can be dispensed with.

During normal operation, the sensor generates measurement signals that are processed in the control programs of the device. The test module can make these measurement signals available to an external test module via the external interface in a first test phase. Furthermore, the test module can interrupt the connection from the internal component to the control program and also feed simulated measurement signals from an external test and simulation module via the external interface in order to test the control program. The test module controls the data flow of the simulated measurement data here, the device with the simulated measurement signals operating in the normal operating mode without the other functions of the device, for example, an internal actuator/lamp, being disrupted. In parallel with the test phase, the real measurement signals of the sensor can nevertheless be observed and further processed internally or externally. In addition to the internal components, such as sensors or actuators, the control program can also be checked by the test module by means of real measurement signals of an external sensor by virtue of the fact that the signal flow is interrupted by the test module and simulated test signals are made available.

In order to prevent the function of the test module being inadvertently activated, a protection device may be provided. The protection device carries out authorization checking of the external test and simulation system that feeds the simulated measurement signals via the external interface.

The function of the control programs can also be tested in conjunction with an internal actuator, in particular a lamp or a display, by virtue of the fact that the output signals of the control programs are checked by means of the test module or made available for evaluation via the external interface to an external test and simulation system. In addition, the internal actuator/sensor can also be checked by virtue of the fact that simulated actuation signals are made available and the reaction of the actuator/sensor is checked.

The device according to the present invention can be implemented, for example, in a control device for hydraulic pressure sensors in the ESP vehicle-movement dynamic system, in air-conditioning control devices or in the engine control device in motor vehicles.

There are various possible ways of advantageously configuring and developing the teaching of the present invention. For this purpose, the subject matter of the invention and, in particular, the following explanation of an embodiment are to be referred to.

BRIEF DESCRIPTION OF THE DRAWINGS

FIG. 1 illustrates an embodiment of the invention.

DETAILED DESCRIPTION OF THE INVENTION

The FIGURE illustrates an embodiment of the device according to the invention for simulation purposes. The device is embodied as a control device whose software architecture is represented with a test module according to the present invention.

The device is embodied as a vehicle control device 1 that is connected to other vehicle control devices via a data bus (not illustrated). A microcomputer 2 for controlling the necessary vehicle functions and that processes control programs, for example, functional software 3, for an internal sensor 4 is arranged in the vehicle control device 1. The control programs 3 control the different processes in the vehicle, the process organization, the control device communication and the individual measuring and control/regulation functions of the individual components being processed here.

In addition to the components that are arranged outside the control device 1, the sensor 4, which measures, for example, the ambient temperature of the control device 1, is arranged within the control device. Sensor actuation software 5, which correspondingly conditions the input data and the result data of the sensor, is assigned to the sensor 4 so that the data can be processed by the functional software of the control programs 3. The sensor actuation software 5 also includes what is referred to as driver software, which permits the sensor 4 to be operated and integrated into the technical environment in the control device 1.

A communications interface driver 6, which permits the necessary communication of the control programs 3 with other control devices via an external interface 7, is also provided in the control device 1. The external interface can be embodied as a multicomponent plug-type connector and can permit, on the one hand, the connection to external components such as sensors and actuators, and on the other hand the connection to an electrical or optical data bus or to an additional external test system or simulation system.

The control device 1 has actuator actuation software 8, which actuates an external actuator, for example, a lamp or an electric motor. The actuator actuation software 8 correspondingly adapts the signals of the control programs 3 so that the external actuator can be actuated by means of these signals.

The signals of the actuator actuation software 8 are correspondingly converted by means of a D/A converter 9 into analog signals and are then present at the plug pins, provided for this purpose, of the external interface 7 so that the external actuator can be connected thereto via a plug-type connector. Likewise, an input/output module 10, which adapts the signals on the one hand for transmission for a data bus and on the other hand for an external test and simulation system, is provided between the communications interface driver 6 and the external interface 7. The A/D converter 11 converts the analog signals of the internal sensor 4 into digital signals so that these can be used in a digital form in the control programs 3 and also in the external modules.

The control device 1 may be surrounded by a housing which protects the electronics 2, 3, 8, 10, 11 arranged within it against environmental influences. Within this housing, a test module 12 is arranged that tests the functional capability of the components connected to the control device 1. In particular, the test module 12 is intended to test internal components such as the internal sensor 4, and for this purpose it is arranged at an internal interface 13 in the data flow of the sensor 4 between the actuating control programs 3 and the sensor 4. The test module 12 checks incoming or outgoing signals of the sensor 4 for faults. For this purpose, the test module 12 makes available a set of test functions as input signals for the sensor 4 and evaluates the result signals output by the sensor 4. In addition, or alternatively, the test module 12 can be connected to an external test and simulation system and may read in simulation signals via the external interface 7 in order to then make these available to the internal sensor 4 as input signals in the test phase.

With respect to the software architecture of the control device 1, the test module 12 constitutes a layer between the control programs 3 and the actuation software 5, 8, or the interface driver 6, through which the entire data flow to and from the components to be tested, such as actuators and sensors 4, runs. In this way, in addition to the simulation, data monitoring also takes place, in which case fault detection may additionally be implemented on the basis of the data flow. For this purpose, input data are compared with the output data of the components and are checked in terms of the value ranges and the presence of specific signal properties. For example, comparators can determine the upward transgression of a threshold value by means of comparison.

The test module 12 has specific test functions in order to check the function of the sensor 4. For this purpose, the test module 12 can interrupt the data flow in the direction of the sensor 4 and predefine the signals that are necessary for its function, itself or on the basis of the simulated signals of an external test and simulation module. The test module can also interrupt the data flow to the actuator. For this purpose, for example, the data flow or the actuation signals are interrupted between the functional software and the actuator actuation software 8. The test module 12 then generates signals for the actuator and the control programs 3, the signals being suitable for a test process. The test module 12 can also interrupt the data flow between the control programs 3 and the external interface 7 and make available simulated test signals. Jump functions, pulses or harmonic signals, insofar as they are analog signals, may be suitable as test functions.

The test module 12 has a measuring device that measures signals of the sensor, actuator or of the functional software 3 and transmits the acquired process representation over the cycle time of the functional software 3 via the external interface 7 to an external computer by means of which the measurement results can then be represented for the developer or in a workshop. The external interface 7 can be provided for connecting an external test and simulation system and for the external computer via a communications medium that is already present in the vehicle. Alternatively, the exchange of test data can be effected via a separate test interface, for example, for the Ethernet or a test data bus.

The test module 12 controls the test process by means of a test program that interrupts the data flows and makes available a set of test functions that are fed into the components at the input end. The test program has a dynamic execution rule for the test sequence, the execution times of the control device software being capable of being influenced. Specific test functions are fed in via the external interface 7. The protocol and the test functions that are transmitted via the external interface are independent of the interface in terms of their data format, so that the test module 12 can be used in a variable way without conversion, even in other control devices.

The test module 12 executes test programs that are made available on the one hand in the test module 12 itself and alternatively by means of an external test and simulation system. These test programs can be loaded via the external interface 7 into the test module 12 and executed by it. The test programs can be executed during the use of the control device 1 in the vehicle in synchrony with the cycle time of the functional software 3. The test programs have access to all the internal process variables, and, during their execution, they resort to functions of the test module 12 that permit signals to be measured and triggered.

The test module 12 can have programs and functions which are programmed as software code, for example, in the language C. The test module 12 is programmed or executed in such a way that during normal operation of the control device 1 no disruption occurs in the program sequence or in the data flow. The test module 12 is an integral component of the control device 1 and can be at least partially a component of the control device software. In order to avoid unintended interventions in security-related areas of the functional software 3, a security mechanism is provided for locking the test module during normal operation of the control device. Here, in order to avoid undesired manipulation of the control of the test module 12, access is possible only via an authentication procedure.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A device for controlling electrical systems of a means of transportation, which is encapsulated within a housing provided with an external interface and which has a microcomputer for executing a control program and storage means on which control programs for actuating an electrical component and signals of the component can be stored, the signals being exchanged via an internal interface by actuation software of the electrical component, and a test module being provided within the housing and at the internal interface of the electrical component in order to evaluate the signals of the electrical component which are exchanged via the interface and in order to test a satisfactory functioning of the electrical component or of the control program, wherein an internal sensor or internal actuator is arranged as an internal component within the encapsulated housing, in that the test module is arranged between the control program and the internal component where an entire data flow to and from the electrical component or internal component to be tested runs and in that the test module checks the incoming or outgoing signals of the internal component for faults.

2. The device of claim 1, wherein the test module at the internal interface interrupts transmission of signals of the control program and feeds in equivalent signals in order to permit testing during normal operation of the device.

3. The device of claim 1, wherein the test module feeds in test signals for the component at the interface.

4. The device of claim 1, wherein the test module has means for measuring, triggering and adapting analog signals.

5. The device of claim 1, wherein the test module receives signals from a test and simulation system which is connected to the external interface, carries out a test process with said signals from said test and simulation system, and exports result data via the external interface.

6. The device of claim 1, wherein the test module is a modular software program which is stored on the storage means of the device in order to test components arranged within the housing.

7. The device of claim 1, wherein, during the normal operation, the test module tests parts of the control program by feeding equivalent signals for the signals of the sensor into the control program.

8. A vehicle control device, said device having a storage means and being encapsulated within a housing having an external interface, comprising:
    a microcomputer for executing a control program;
    an internal component;
    an internal interface; and
    a test module;
    wherein said storage means stores said control program and signals of said internal component or an external component,
    wherein said test module evaluates signals sent to and from said internal component or said external component,
    wherein said test module tests said internal component or said external component or said control program, and
    wherein said internal component or said external component communicates with said test module via said interface.

9. The device of claim 8, wherein said test module interrupts transmission of signals of said control program via said internal interface and feeds equivalent signals in order to permit testing during a normal operation of the device.

10. The device of claim 8, wherein said test module feeds test signals for said internal component or said external component at said internal interface.

11. The device of claim 8, wherein said test module comprises means for measuring, triggering, and adapting analog signals.

12. The device of claim 8, wherein said test module receives signals from a test and simulation system which is connected to said external interface, carries out the test process with signals from said test and simulation system, and exports result data via said external interface.

13. The device of claim 8, wherein said test module is a modular software program stored in said storage means in order to test said internal component.

14. The device of claim 8, wherein said internal component comprises a sensor.

15. The device of claim 14, wherein, during normal operation, said test module tests parts of said control program by feeding equivalent signals for signals of said internal component into said control program.

16. The device of claim 8, wherein said internal component comprises an actuator.

* * * * *